Figure 1:
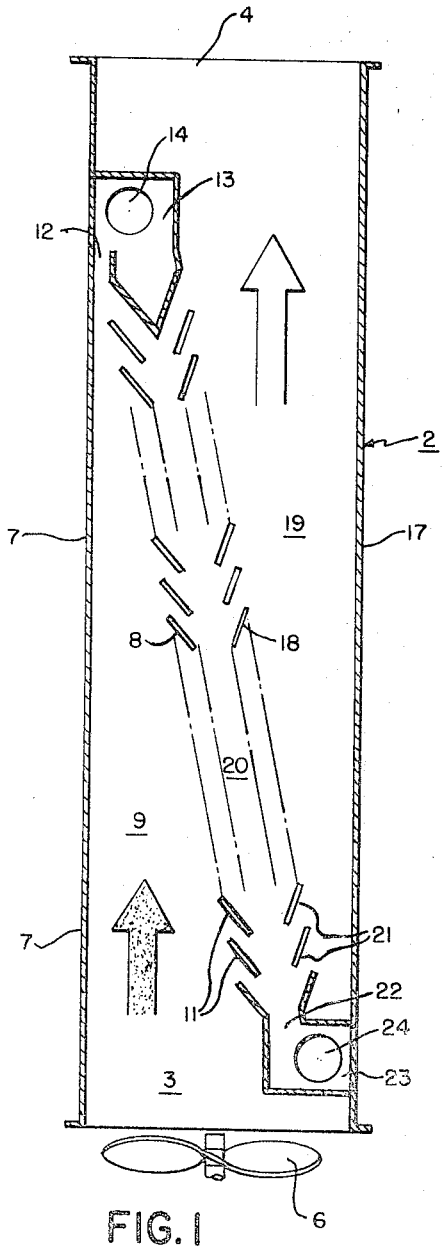

Sept. 19, 1967 K. L. WESTLIN 3,342,024
DUST COLLECTOR APPARATUS
Filed March 1, 1965

INVENTOR.
KARL L. WESTLIN
BY
ATTORNEY

United States Patent Office 3,342,024
Patented Sept. 19, 1967

3,342,024
DUST COLLECTOR APPARATUS
Karl L. Westlin, Louisville, Ky., assignor to American Air Filter Company, Inc., Louisville, Ky., a corporation of Delaware
Filed Mar. 1, 1965, Ser. No. 435,912
4 Claims. (Cl. 55—443)

The present invention relates to dust collector apparatus for separating contaminant particles from a dirty gas stream and more particularly to dust collector apparatus of the louvered type wherein dust is separated from a dirty gas stream by passing the gas stream through louvers disposed to abruptly change the direction of flow of the gas stream so as to separate dust particles from such stream.

In accordance with the present invention, a novel and useful dust separator assembly is provided which can be adapted to various types of conduit systems to operate at high dust separating efficiency, providing maximum dust particle removal from a treated gas stream and, at the same time, providing substantially similar gas flow direction at the inlet and outlet of the conduit system to permit utilization of a substantially straight line conduit arrangement with a minimum of energy loss. In addition, the present invention provides a dust separating assembly which can be adapted to provide gradient separation in an economical and straightforward manner. Further, the present invention provides a dust separator assembly compact in form, economical to manufacture and operate, and adaptable to dust collecting systems for treating large volumes of dirty gas in an efficient manner.

Various other features of the present invention will become obvious to one skilled in the art upon reading the disclosure set forth herein.

More particularly, the present invention provides a dust collector apparatus for separating contaminant particles from a dirty gas stream comprising a gas flow path defining casing means having aligned and opposed dirty gas inlet means and clean gas outlet means; means to move a dirty gas stream to be treated through the casing means; first louvered partition wall means extending lengthwise of the casing means from the dirty gas inlet means towards the clean gas outlet means in a converging manner with a first portion of the wall of the casing means to form dirty gas plenum means therewith, the louvers of the first partition wall means being so disposed that the treated gas stream is abruptly changed from its initial direction of flow towards the clean gas outlet means as it passes through the louvers; a first dust particle outlet means opposite the dirty gas inlet means and in communication with the dirty gas plenum means; second louvered partition wall means spaced from and extending substantially parallel to the first louvered partition wall means and converging with a second portion of the wall of the casing substantially opposite the first portion of the wall of the casing to form a clean gas outlet plenum means therewith in communication with the clean gas outlet means and to provide an intermediate gas plenum means between the first and second partition wall means; the louvers of the second partition wall means being so disposed that the treated gas stream again is abruptly changed from its direction of flow as it passes through such louvers to resume its initial direction of flow towards the clean gas outlet means; and a second dust particle outlet means opposite the clean gas outlet means and in communication with the intermediate gas plenum means to receive dust particles therefrom.

It is to be understood that various changes can be made by one skilled in the art in the arrangement, form and construction of the apparatus set forth herein without departing from the scope or spirit of the present invention.

Figure 2:
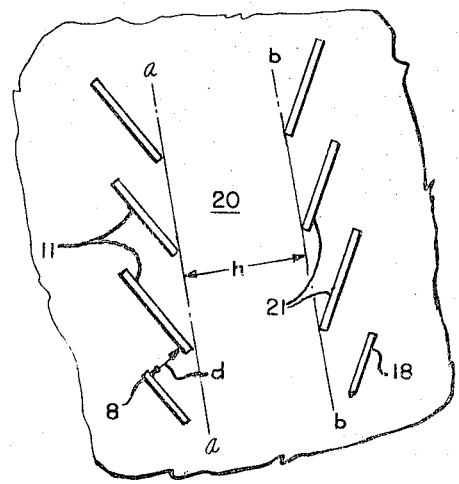
Figure 3:
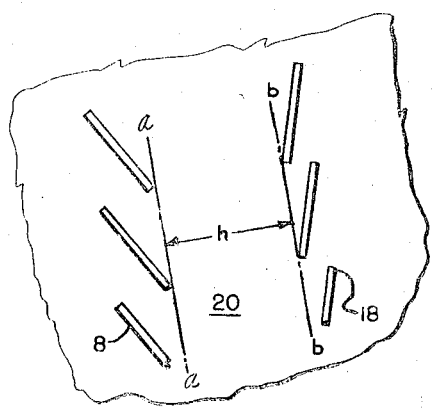

Referring to the drawing:
FIGURE 1 is a cross-sectional schematic view of a gas flow path defining casing provided with a prime mover at the dirty gas inlet side thereof and including the inventive dust-collecting apparatus therein;
FIGURE 2 is an enlarged cross-sectional view of a portion of the louvers of FIGURE 1; and
FIGURE 3 is a cross-sectional view like FIGURE 2 of a portion of a modified casing showing the louvers of the downstream partition wall in closer spaced relationship than the louvers of the upstream wall.

As can be seen in the drawing, gas flow path defining casing 2 includes dirty gas inlet 3 and opposed clean gas outlet 4. Casing 2, which is disclosed as a conduit of rectangular cross section, includes a prime mover in the form of blower 6 positioned adjacent dirty gas inlet 3. It is to be understood that casing 2 can have other cross-sectional configurations and that blower 6, which can be motor driven (not shown), can be positioned elsewwhere along the casing to move a dirty gas stream to be treated therethrough.

Extending lengthwise of casing 2 from dirty gas inlet 3 toward clean gas outlet 4 in converging manner with side 7 of casing 2 to form dirty gas plenum 9 of diminishing flow area is a first partition wall 8. Wall 8 is provided with a plurality of spaced passage defining louvers 11 which extend transverse the direction of gas flow from dirty gas inlet 3, the spaced louvers forming gas outlet passages therebetween. The spaced louvers can be arranged in rows with the louvers inclined from their respective wall 8 to insure an abrupt change in direction of gas flow and to thereby separate dust particles from the gas stream by centrifugal action. It is to be understood that the spaced louvers can be arranged in any number of rows desired with their angles of inclination also arranged in accordance with the particular results desired. Positioned opposite dirty gas inlet 3 and in communication with dirty gas plenum 9 is dust particle outlet 12. Dust particle outlet 12 leads to dust collection chamber 13 disposed within casing 2. Chamber 13, in turn, is provided with outlet 14 through which dust particles separated from the gas stream by louvered wall 8 can be removed as the occasion warrants.

Extending substantially parallel partition wall 8 in spaced relationship therefrom to converge with side 17 of casing 2 opposite side 7 is louvered partition wall 18. Wall 18 serves to form clean gas outlet plenum 19 between itself and wall 17, the plenum 19 being in communication with clean gas outlet 4. In addition, wall 18 serves to form intermediate gas plenum 20 between itself and wall 8, plenum 20 being bounded at one end by dust collection chamber 13.

Wall 18 is provided with a plurality of spaced louvers 21. Louvers 21, like louvers 11, extend transverse the direction of gas flow; however, louvers 21 are inclined from their wall in mirror-image fashion to louvers 11 to thus insure a further immediately successive abrupt change in the direction of gas flow substantially opposite the direction of gas flow brought about by louvers 11. It is to be noted that the wall defining chamber 13 and which bounds intermediate chamber 20 at one end thereof is V-shaped to conform with the inclined disposition of louvers 11 and 21 of partition walls 8 and 18 respectively. A dust particle outlet 22 positioned at the end of casing 2 opposite clean gas outlet 4 communicates with the other end of intermediate chamber 20 to receive dust particles separated from the gas stream as it passes through louvers 21 of wall 18. Dust particle outlet 22 communicates with dust collection chamber 23, which, in turn, has a dust particle outlet 24 from which dust can be removed as the occasion warrants. It is to be noted that, if desired, the spacing between louvers 21 of partition wall 18 can be less than the spacing between louvers 11 of partition wall 8 (FIGURE 3) to provide gradient separation, with removal of the larger dust particles being accomplished by upstream wall 8 and the finer particles being accomplished by downstream wall 18. It further is to be noted that, advantageously, broken line a—a which determines the trailing edge of louvers 11 of upstream partition wall 8 is spaced from broken line b—b which determines the leading edge of louvers 21 of downstream partition wall 18, a normal distance as indicated by $h$ which is sufficient to avoid dust particle clogging along the length of intermediate plenum 20 but not so excessive as to permit significant dissipation of the gas velocity component toward the outlet 22 of plenum 20. This insures an optimum operation of louvered wall 18 as a separator and, at the same time, permits this wall to reinstate the gas flow path to its initial direction. It has been found that, advantageously, distance $h$ can be approximately 3 to approximately 20 times the distance $d$, the normal distance between louvers 11 of louvered wall 8.

In a typical operation, gas to be cleaned is introduced into dirty gas plenum 9 of casing 2 through dirty gas inlet 3, blower 6 at the gas inlet 3 serving to move the gas stream through the casing from dirty gas inlet 3 to clean gas outlet 4. The gas enters into dirty gas inlet plenum 9 flowing through gas outlet passages formed by louvers 11. Since louvers 11 are disclosed to abruptly change the direction of gas flow, some of the dust particles in the gas are separated therefrom by centrifugal action and instead of passing along with the gas into intermediate gas plenum 20, such dust particles are passed into dust trough 13. As the gas passes from intermediate gas chamber 20 through louvered partition wall 18, the gas is once again abruptly changed in its direction of flow to resume the flow direction it initially had as it entered into gas inlet 3. The remaining dust particles in the gas are separated by centrifugal action brought about by inclined louvers 21 of wall 18, such particles passing out through outlet 22 into trough 23 for removal. The clean gas passes through louvers 21 into clean gas plenum 19 and out clean gas outlet 4.

I claim:

1. Dust collector apparatus for separating contaminant particles from a dirty gas stream comprising a gas flow path defining casing means having spaced, substantially aligned and opposed dirty gas inlet means and clean gas outlet means; means to move said dirty gas stream through said casing means; first louvered partition wall means having spaced passage-defining louvers, said partition wall means extending lengthwise of said casing from said dirty gas inlet means toward said clean gas outlet means along the general direction of gas flow in an inclined manner with a first portion of the wall of said casing to form a dirty gas inlet plenum means therewith converging in the direction of gas flow, the louvers of said first partition wall means being inclined so that the spaced passages defined thereby have their upstream portions closer to said clean gas outlet means of said casing than their downstream portions so that gas flowing in said inlet plenum is abruptly changed from its initial direction of flow towards said clean gas outlet means as it passes through said spaced passages defined by said louvers; a first dust particle outlet means opposite said dirty gas inlet means and in communication with said dirty gas plenum means; second louvered partition wall means having spaced passage-defining louvers, said second partition wall means extending substantially parallel to said first louvered partition wall means along the general direction of gas flow and converging with a second portion of the wall of said casing means substantially opposite said first portion of the wall of said casing means to form a clean gas outlet plenum means therewith diverging in the direction of gas flow in communication with said clean gas outlet means and to provide an intermediate gas plenum means between said first and said second partition wall means, the louvers of said second partition wall means being inclined so that the spaced passages defined thereby have the upstream portions closer to said downstream gas inlet of said casing means than their downstream portions so that gas flowing in said intermediate gas plenum is again abruptly changed from its direction of flow as it passes through said spaced passages defined by said louvers of said second partition wall to resume its initial direction of flow towards said clean gas outlet means; and a second dust particle outlet means spaced from and opposite said first dust particle outlet and said clean gas outlet and in communication with said intermediate gas plenum means to receive dust particles therefrom.

2. The apparatus of claim 1, the louvers of said second partition wall means having a closer spacing than the louvers of said first partition wall means.

3. The apparatus of claim 1, a first dust collection chamber disposed within said casing to communicate with said first dust particle outlet and to form a boundary for said intermediate plenum; and a second dust collection chamber disposed within said casing to communicate with said second dust particle outlet and to form a boundary for said clean gas plenum.

4. The apparatus of claim 3, said first dust collection chamber being shaped to conform with the disposition of the louvers of said first and second louvered partition walls forming said intermediate gas plenum.

References Cited

UNITED STATES PATENTS

| 672,299 | 4/1901 | Thompson | 55—443 X |
| 2,122,511 | 7/1938 | Bubar | 55—443 X |
| 2,152,115 | 3/1939 | Van Tongeren. | |
| 2,833,373 | 5/1958 | Custer. | |

FOREIGN PATENTS

| 442,180 | 6/1912 | France. |
| 891,994 | 12/1943 | France. |
| 449,765 | 6/1936 | Great Britain. |

HARRY B. THORNTON, *Primary Examiner.*

ROBERT F. BURNETT, *Examiner.*

B. NOZICK, *Assistant Examiner.*